2,993,916
PURIFICATION OF ETHYLENE OXIDE
James B. Normington, Little Silver, N.J., assignor to General Aniline & Film Corporation, New York, N.Y., a corporation of Delaware
No Drawing. Filed July 22, 1958, Ser. No. 750,259
3 Claims. (Cl. 260—348)

This invention relates to a method of purifying ethylene oxide produced by the catalytic oxidation of ethylene in order to remove "aldehydic" impurities therefrom.

In the production of ethylene oxide by the catalytic oxidation of ethylene employing silver catalyst, the ethylene oxide which is obtained frequently contains a minor amount, of the order of 0.05 to 0.1% by weight, of acetaldehyde and possibly other impurities of an "aldehydic" nature which react with sodium bisulfite in standard analytic procedures for aldehydes and which are, therefore, hereinafter referred to as "aldehydic" impurities although their precise nature has not been definitely established. For certain purposes the ethylene oxide containing 0.1% or even slightly more of these "aldehydic" impurities may be employed without further purification. However, for other purposes it is desirable that the "aldehydic" impurity content of the ethylene oxide be 0.01% by weight or lower e.g., in certain reactions these impurities impart a color to the products obtained from the ethylene oxide.

Heretofore, when it has been desired to produce ethylene oxide having less than 0.01% by weight of "aldehydic" impurities, it has been customary to subject the ethylene oxide to fractional distillation in a multi-plate still. However, since ethylene oxide boils at about 13° C. and acetaldehyde at 20° C. to 21° C. not only is the capital investment necessary in the still quite high due to the large number of plates required, but also the operating expenses are necessarily high due to the high reflux ratios and amount of cooling which is required.

I have now found that the "aldehydic" impurities may be largely removed from ethylene oxide by contacting the ethylene oxide containing the "aldehydic" impurities with certain ion exchange resins of the polyamine type of the type employed for removing acid from water. This is rather surprising since ion exchange resins of this type have heretofore been employed for removing acid from formaldehyde.

I have found that those ion exchange resins which are classified as "weak basic anion exchange resins" are unique in their ability to reduce the "aldehydic" impurities content of ethylene oxide. I particularly prefer the weak base anion exchange resins based upon the amination of the chloromethylated styrene-divinylbenzene copolymer. A typical anion exchange resin of this type is that represented by the following formula

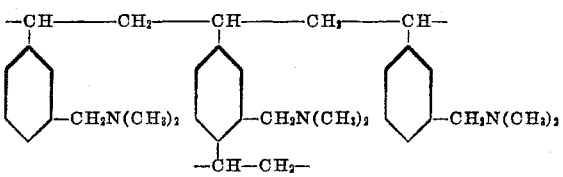

Resins of this type are commercially available as "Amberlite IR 45"—Rohm & Haas Co., and "Dowex 3"—Dow Chemical Co. The weakly basic resins which I have found to be effective for freeing ethylene oxide of "aldehydic" impurities, include those which are described and discussed in U.S. Patents Nos. 2,106,486; 2,151,883; 2,223,930; 2,251,234; 2,259,169; 2,285,750; 2,341,907; 2,354,671; 2,354,672; 2,356,141; 2,366,008; 2,388,235 and 2,402,384, but, as mentioned above, I particularly prefer the weakly basic polyamine anion exchange resins disclosed in Patent No. 2,591,574. These resins described in Patent No. 2,591,574 are made by chloroalkylating an insoluble copolymer of a monovinyl aromatic hydrocarbon and a divinyl aromatic hydrocarbon and then reacting the chloroalkylated copolymer with a primary or a secondary amine, whereby amino groups are introduced into the resinous, insoluble copolymer. All of the resins which are disclosed in these patents and by McBurney are capable of sorbing acids but they are not capable of splitting neutral salts such as sodium chloride to a significant extent. The strongly basic anion exchange resins, particularly polystyrene quaternary ammonium types such as those disclosed in U.S. Patent 2,591,573 of C. H. McBurney have little or much less effect on the "aldehydic" impurity content of ethylene oxide.

In brief, the process of the present invention comprises contacting liquified ethylene oxide, either anhydrous or containing appreciable amounts of water, with a weakly basic anion exchange resin of the polyamine type. Such contacting may be effected either by stirring the particles of the resin in the ethylene oxide or more preferably by flowing ethylene oxide through a column of the resin.

The details of the present invention will be apparent to those skilled in the art from consideration of the following examples.

Example 1

A series of experiments were carried out in which a given amount of a commercially available weakly basic anion exchange resin of the polyamine type i.e., the product sold by Rohm & Haas Company under the trade name "Amberlite IR 45," was added to ethylene oxide (both anhydrous ethylene oxide and ethylene oxide containing about 12% by weight of water) and the mixture stirred at 0 to minus 5° C. for from ½ hour to 2 hours after which the resin was removed by filtration. The ethylene oxide used in this series of experiments contained 0.076% "aldehydes" by analysis with sodium bisulfiate. The results obtained in these experiments are given below in Table I. In this table in column 2 there is given the amount of ethylene oxide employed in each experiment and whether this was wet or dry; column 3, the amount of polyamine type anion exchange resin employed; column 4, the time of contact or stirring; columns 5 and 6, the "aldehyde" content of the ethylene oxide before and after treatment respectively; and column 7, the purity of the resultant ethylene oxide. In those experiments in which the ethylene oxide was wet there was employed 12 ml. of water to 100 ml. (88 g.) of ethylene oxide, this amount of water being employed since it is approximately the amount of water contained in ethylene oxide recovered by absorption in water and prior to drying of the ethylene oxide, and in those experiments in which the anion exchange resin employed was wet its dry weight was 57% of that shown in the table.

| Experiment No. | Ethylene Oxide | Resin | Time, hr. | Percent "Aldehydes" by weight | | Ethylene Oxide, Percent |
|---|---|---|---|---|---|---|
| | | | | Original | After treatment | |
| 1 | 100 ml. wet | 5 g. wet | ½ | 0.076 | 0.008 | 98.5 |
| 2 | 100 ml. wet | 5 g. wet | 2 | 0.076 | 0.008 | 97.6 |
| 3 | 150 ml. wet | 1.5 g. wet | ½ | 0.076 | 0.039 | 99.2 |
| 4 | 150 ml. wet | 1.5 g. wet | 2 | 0.076 | 0.039 | 98.5 |
| 5 | 150 ml. wet | 1.5 g. wet | ½ | 0.076 | 0.0092 | 97.0 |
| 6 | 150 ml. wet | 1.5 g. wet | 2 | 0.076 | 0.0062 | 95.7 |
| 7 | 100 ml. dry | 2.8 g. dry | ½ | 0.076 | 0.014 | 99.5 |
| 8 | 100 ml. dry | 2.8 g. dry | 2 | 0.076 | 0.002 | 99.4 |
| 9 | 100 ml. dry | 8.4 g. dry | ½ | 0.076 | 0.010 | 99.4 |
| 10 | 100 ml. dry | 8.4 g. dry | 2 | 0.076 | 0.003 | 99.4 |
| 11 | 100 ml. dry | 8.4 g. dry | 2 | 0.076 | 0.001 | 99.5 |
| 12 | 100 ml. wet | 15.0 g. wet | 2 | 0.076 | 0.003 | |
| 13 | 100 ml. dry | 9.3 g. dry | 2 | 0.076 | 0.002 | |

It will be noted from the above table that approximately 3% by weight of resin on dry basis is sufficient to effect essentially complete removal of the "aldehydic" impurities from the ethylene oxide. The contact time of ½ hour will in general reduce the "aldehydic" impurity content of about in the order of 0.01%, while contact time of 2 hours will reduce it to the order of 0.003% or lower. There is therefore essentially no advantage in using larger amounts of resin or longer contact although they have no adverse effect on the quality of the resultant ethylene oxide.

*Example 2*

The process may also be carried out in a continuous manner by flowing the liquified ethylene oxide through a column filled with the basic anion exchange resin of the polyamine type. This method of operation is illustrated by the following example.

A jacketed 1" by 12" glass column is maintained at a temperature of 0 to minus 5° C. by flowing the refrigerant through the jacket. A layer of sand approximately 1" in depth is placed in the bottom. The required amount of ion exchange resin is slurried with either anhydrous or aqueous liquid ethylene oxide. This mixture is poured into the column until a resin bed having a depth approximately of 8 to 10 inches has been built up. Liquid ethylene oxide (either anhydrous or aqueous) is then caused to pass downwardly through this column at a rate corresponding to 1 to 10 gallons per cubic feet per minute. The influent ethylene oxide had an aldehyde content of 0.076% "aldehydic" impurities by sodium bisulfite analysis and the effluent ethylene oxide had an aldehyde content of 0.001% at the start of the run and further introduction of ethylene oxide was stopped after the aldehydic impurity content of effluent ethylene oxide had risen to 0.008%. The resin was then regenerated by passing 4% sodium hydroxide solution upwardly through the column. After regeneration the resin was found to be again essentially as effective as freshly charged resin for the removal of "aldehydic" impurities from the ethylene oxide. By providing several columns in parallel, some of which are on regeneration, while others are on stream, the process can be made fully continuous.

*Example 3*

The procedure of Example 1 was repeated by mixing 100 ml. (88 g.) of liquified ethylene oxide and 12 ml. of water cooled to 0 to 5° C. with 5 g. of a wet (dry weight 57%) weakly basic anion exchange resin prepared by the process of Example 6 of U.S. Patent 2,591,574. Stirring was continued for 2 hours at 0 to 5° C. after which the ethylene oxide was separated from the resin by filtration. The ethylene oxide used in this experiment when analyzed with sodium bisulfite was found to have an "aldehyde" content of 0.076%. The recovered ethylene oxide on similar analysis was found to contain less than 0.01% "aldehydes."

The experiment was again repeated using, however, anhydrous ethylene oxide and 5 g. of dry resin prepared by the process of Example 6 of Patent 2,651,574; analysis with sodium bisulfite of the recovered ethylene oxide showed an "aldehyde" content less than 0.01%.

The foregoing procedure was repeated by adding to 100 ml. of ethylene oxide having an "aldehyde" content of 0.076% 12 ml. of water, and 7.5 g. of the wet (dry weight 57%) weakly basic anion exchange resin prepared by the process of Example 7 of U.S. Patent 2,591,574. The recovered ethylene oxide on analysis with sodium bisulfite had an "aldehyde" content less than 0.01%.

This experiment was again repeated using with 100 ml. of dry ethylene oxide (aldehyde content 0.076%) and 5 g. of dry resin obtained by the procedure of Example 7 of Patent 2,591,574. The recovered ethylene oxide on analysis with sodium bisulfite had an aldehyde content less than 0.01% by weight.

I claim:

1. The process for reducing the aldehyde content of ethylene oxide produced by the catalytic oxidation of ethylene and containing a minor amount of aldehyde impurities which react with sodium bisulfite which comprises contacting said impure ethylene oxide with a weakly basic polyamine anion exchange resin and recovering purified ethylene oxide having a lowered aldehyde impurity content.

2. The process as defined in claim 1 wherein the weakly basic anion exchange resin is the reaction product of (1) a chloromethylated copolymer of a mixture of aromatic monovinyl hydrocarbon and an aromatic divinyl hydrocarbon, said mixture containing a predominant amount of said monovinyl hydrocarbon and said copolymer containing on the aromatic nuclei thereof substituent groups of the formula —$CH_2Cl$, and (2) an amine containing a hydrogen atom on the nitrogen atom.

3. The process as defined in claim 1 wherein the weakly basic anion exchange resin specified is the reaction product of (1) a halomethylated copolymer of a major proportion of a monovinyl aromatic hydrocarbon with from 0.5 to 20.0% of a divinyl aromatic hydrocarbon, the said copolymer containing an average of from 0.2 to 1.2 halomethyl groups per aromatic nucleus, and (2) a primary amine in amount sufficient to furnish at least one ammonia-type nitrogen atom for each substituent halomethyl radical in said halomethylated copolymer.

References Cited in the file of this patent

UNITED STATES PATENTS 2,697,104    Lowe ------------------ Dec. 14, 1954

OTHER REFERENCES

Lowy et al.: Introduction to Organic Chemistry, 1946, p. 87.

Nachod: Ion Exchange Technology, 1956, pages 556, 557, 563 and 564.